(12) United States Patent
Tacklind et al.

(10) Patent No.: US 8,739,687 B1
(45) Date of Patent: Jun. 3, 2014

(54) DEVICE FOR METERING COFFEE BREWING

(75) Inventors: Christopher Tacklind, Menlo Park, CA (US); R Brooke Hanson, Larkspur, CA (US)

(73) Assignee: Shearwater Investment Company, Larkspur, CA (US)

( * ) Notice: Subject to any disclaimer, the term of this patent is extended or adjusted under 35 U.S.C. 154(b) by 433 days.

(21) Appl. No.: 13/208,291

(22) Filed: Aug. 11, 2011

(51) Int. Cl.
*A47J 31/42* (2006.01)
*A47J 31/40* (2006.01)
*A47J 31/56* (2006.01)

(52) U.S. Cl.
CPC ............... *A47J 31/42* (2013.01); *A47J 31/401* (2013.01); *A47J 31/402* (2013.01); *A47J 31/404* (2013.01); *A47J 31/56* (2013.01)
USPC ............... 99/280; 99/283; 99/286; 99/289 R; 99/290; 99/299; 99/300

(58) Field of Classification Search
CPC ........... A47J 31/42; A47J 31/56; A47J 31/40; A47J 31/401; A47J 31/402; A47J 31/404
USPC ....... 99/280, 281, 283, 286, 289 R, 290, 300, 99/302 R, 307, 299
See application file for complete search history.

(56) References Cited

U.S. PATENT DOCUMENTS

| | | | |
|---|---|---|---|
| 4,007,675 A * | 2/1977 | Cailliot et al. | 99/286 |
| 4,100,306 A | 7/1978 | Gregg et al. | |
| 4,823,685 A | 4/1989 | Boumans et al. | |
| 4,967,647 A | 11/1990 | King | |
| 5,094,153 A * | 3/1992 | Helbling | 99/280 |
| 5,285,718 A | 2/1994 | Webster et al. | |
| 5,307,733 A | 5/1994 | Enomoto | |
| 5,386,944 A | 2/1995 | Knepler et al. | |
| 5,417,145 A * | 5/1995 | Joseph et al. | 99/280 |
| 5,465,650 A * | 11/1995 | Friedrich et al. | 99/286 |
| 5,568,763 A * | 10/1996 | Kunzler | 99/280 |
| 5,615,601 A * | 4/1997 | Eugstar | 99/280 |
| 5,813,318 A * | 9/1998 | Zanin et al. | 99/291 |
| 5,980,965 A | 11/1999 | Jefferson, Jr. et al. | |
| 6,095,031 A | 8/2000 | Warne | |
| 6,099,878 A | 8/2000 | Arksey | |
| 6,279,461 B1 | 8/2001 | Fukushima et al. | |
| 6,576,282 B1 | 6/2003 | Lassota | |
| 6,772,676 B2 | 8/2004 | Lassota | |

(Continued)

FOREIGN PATENT DOCUMENTS

| EP | 250810 | 1/1988 |
|---|---|---|
| JP | 2198524 | 8/1990 |
| WO | PCT/AU2008/000187 | 2/2008 |

*Primary Examiner* — Reginald L Alexander
(74) *Attorney, Agent, or Firm* — Bay Area Technology Law Group, PC

(57) ABSTRACT

A device for brewing coffee. The device includes a microprocessor, a user actuated controller for interfacing with the microprocessor, a tank for retaining water and a heating element for selectively heating the water. The device further includes a brewing basket for receipt of water from the tank, and a cone valve located in a dispersing end of the brewing basket. The microprocessor dictates a measured quantity of water to be delivered to the brewing basket in conjunction with a measured amount of ground coffee for brewing. In a preferred embodiment, a multichannel valve is employed together with a suitable pump for controlling fluid flow as dictated by the microprocessor.

59 Claims, 10 Drawing Sheets

(56) References Cited

U.S. PATENT DOCUMENTS

| | | |
|---|---|---|
| 7,225,728 B2 | 6/2007 | Lyall, III |
| 7,228,066 B2 | 6/2007 | Pope |
| 7,258,062 B2 | 8/2007 | Green |
| 7,640,851 B2 * | 1/2010 | Blair et al. ............... 99/504 |
| 7,717,026 B1 * | 5/2010 | Lassota ..................... 99/283 |
| 2003/0157227 A1 | 8/2003 | Leung et al. |
| 2005/0235834 A1 | 10/2005 | Blanc et al. |
| 2006/0188620 A1 | 8/2006 | Gutwein et al. |
| 2006/0191420 A1 | 8/2006 | Mazzola et al. |
| 2007/0017382 A1 | 1/2007 | Takizawa et al. |
| 2007/0034083 A1 | 2/2007 | Van Hattem et al. |
| 2007/0034084 A1 | 2/2007 | Shertok et al. |
| 2007/0089612 A1 | 4/2007 | Coccia et al. |
| 2007/0107604 A1 | 5/2007 | Wei |
| 2007/0131119 A1 | 6/2007 | Kodden et al. |
| 2007/0131121 A1 | 6/2007 | Pepper et al. |
| 2007/0154571 A1 | 7/2007 | Cao |
| 2007/0193452 A1 | 8/2007 | Campetella et al. |
| 2007/0214966 A1 | 9/2007 | Bishop et al. |
| 2008/0148956 A1 | 6/2008 | Maurer |
| 2009/0188394 A1 * | 7/2009 | Sinnema et al. ............ 99/287 |
| 2010/0024657 A9 * | 2/2010 | Nosler et al. ............ 99/289 R |

\* cited by examiner

DEVICE FOR METERING COFFEE BREWING

TECHNICAL FIELD

The present invention is directed to a device for the precise brewing of coffee pursuant to user imposed parameters. The device, employing a suitable microprocessor, can control the quantity of water, coffee and agitation, and based such parameters as coffee roast, grind, desired extraction and desired strength enable a user to repeatedly craft an ideal coffee beverage. The present device can be integrated with pre-existing coffee brewing devices to achieve the desired results.

BACKGROUND OF THE INVENTION

In the crowded field of coffee makers, there are taught thousands of devices and methods for making coffee. Many of these make a variable quantity of coffee and/or variable strength coffee. This is accomplished by a myriad of devices from percolators, 1.5 to simple drippers, through complex commercial systems. The resulting quality of the coffee is hotly debated in every coffee shop and now in every coffee blog. Every new device and method claims to be an improvement commonly without any objective justification.

In commercial vending systems, it is well understood that it is necessary to achieve the correct strength in the reconstituted mixture of coffee, soda, or juice. To this end various methods are used to ensure proper strength. Usually this involves metering the concentrate and water in a prescribed ratio. In U.S. Pat. No. 6,387,424 electric conductance of the mixture is measured to estimate the percentage of "Total Dissolved Solids" (% TDS) of the mixture. The % TDS is simply the ratio of the mass of the solid material to the total mass of the resulting mixture.

Only a few coffee patents even mention the concept of % TDS as a quantitative measure of the strength of the coffee. In U.S. Pat. No. 7,047,870 Gantt presents an apparatus and method for varying the strength of coffee in "pod" systems. In these systems, a pre-measured volume of ground coffee is packaged in a filter pod. The pod is placed in a machine and hot water is forced through it to produce a coffee beverage. In the method described, the apparatus removes varying percentages of the solid coffee to produce a "light," "regular," or "strong," cup of coffee. This is a disastrous recipe since it also changes the "Percent Extraction" (% EXT). This is the fraction of the original coffee grounds that is dissolved out into the resultant solution. A 20% TDS+/−1% is generally considered the ideal extraction percentage. Above 22% EXT removes too much of the solids including compounds that make the resulting coffee taste bitter. Below 18% TDS presents an "under developed" taste.

It is typical of drip coffee makers to under extract the coffee. So a user that desires a stronger coffee has no choice but to use more grounds. Collectively, this results in a tremendous waste of coffee in the $18 billion domestic market.

The Specialty Coffee Association of America (SCCA), among others, promotes brewing charts to assist in making an ideal cup of coffee. These are used with an optical refraction meter or electrical conductivity meter to estimate % TDS. With the help of the chart the % EXT may also be inferred. The published advice however is limited to statements to the effect of "keep the water in contact with the grounds longer to get more extraction." This advice has no precision and leaves the aspiring brewer with a frustrating task.

To further the art of coffee making, applicant disclosed a novel brewing device in its U.S. application Ser. No. 12/486,514 filed on Jun. 17, 2009, a copy of which is incorporated by reference herein. This apparatus was taught to be capable of making an ideal cup of coffee in accordance with the "Gold Cup" standard as defined by the Specialty Coffee Association of America, the Norwegian Coffee Counsel and other trade organizations and the governing bodies of such standards and, in doing so, to produce coffee according to any taste preference.

Most commercially available coffee makers provide inconsistent and unpredictable results. Some of them produce coffee which is weak and underdeveloped while others produce coffee which is strong and bitter. Such devices, to be successful, require the ability to repeatedly introduce the appropriate amount of water, at the appropriate temperature with the appropriate amount of ground coffee, at a suitable grind controlling the interaction between the grinds and water appropriately.

Most coffee makers work under the drip system where water dribbles into the brewing basket and leaches through the coffee bed as more water is introduced. This continues before the grinds are uniformly wetted. For a manual 1-cup drip cone, the state of the art is to use trial and error to find a set of steps that produce a desired product. The resulting recipe is recorded and then repeated. The task is even more daunting for the designer of a home drip machine which needs to produce a variety of volumes.

A more controlled method is needed with sufficient variables so that the ideal brew point can be achieved each time. Moreover, the brew variables including, but not limited to, darkness of roast, ground size and volume of the brew all need to be accounted for to produce a desired product each time.

As noted in applicant's U.S. application Ser. No. 13/177,410, filed on Jul. 6, 2011, the disclosure of which is incorporated by reference, teaches a method of developing an ideal coffee beverage based upon user inputs including taste, body and strength profile as represented by total and dissolved solids (TDS) and percent extraction (% EXT). Based upon these values, the appropriate amount of coffee is delivered to a brewing chamber and the amount of water and contact time between the ground coffee and water is determined including an accounting for agitation. In doing so, the following equations were taught to achieve the appropriate taste/body and strength profiles as selected by the user.

$$\text{Water} = \text{Dose} * \% \text{ EXT}/\% \text{ TDS} \tag{1}$$

$$\text{BrewTime} = A + B * \% \text{ TDS} + C * \text{Grind} + D * \text{Roast} + E * WM + F * \text{Temerature} \tag{2}$$

The constants A, B, C, D, E, and F depend on the particular brew process employed. In another preferred embodiment, the amount of Water may be introduced to the system and the Dose is computed by $$\text{Dose} = \text{Water} * \% \text{ TDS}/\% \text{ EXT} \tag{3}$$

The steps required are precise and complex suggesting a complex and expensive brewing apparatus. Therefore it is an object of the present invention to disclose simple methods of achieving these tasks in an inexpensive device.

This and further objects will be more readily apparent when considering the following disclosure and appended claims.

SUMMARY OF THE INVENTION

A device for brewing coffee. The device includes a microprocessor, a user actuated controller for interfacing with the microprocessor, a tank for retaining water and a heating element for selectively heating the water. The device further includes a brewing basket for receipt of water from the tank, and a cone valve located in a dispersing end of the brewing basket. The microprocessor dictates a measured quantity of water to be delivered to the brewing basket in conjunction with a measured amount of ground coffee for brewing. In a preferred embodiment, a multichannel valve is employed together with a suitable pump for controlling fluid flow as dictated by the microprocessor.

BRIEF DESCRIPTION OF THE DRAWINGS

FIG. 6b is a bottom perspective view of the multi valve assembly with water, air ports and switch port of FIG. 6a.

FIG. 7b is a bottom perspective view of the multi valve assembly of 7a.

DETAILED DESCRIPTION OF THE INVENTION

Figure 1:
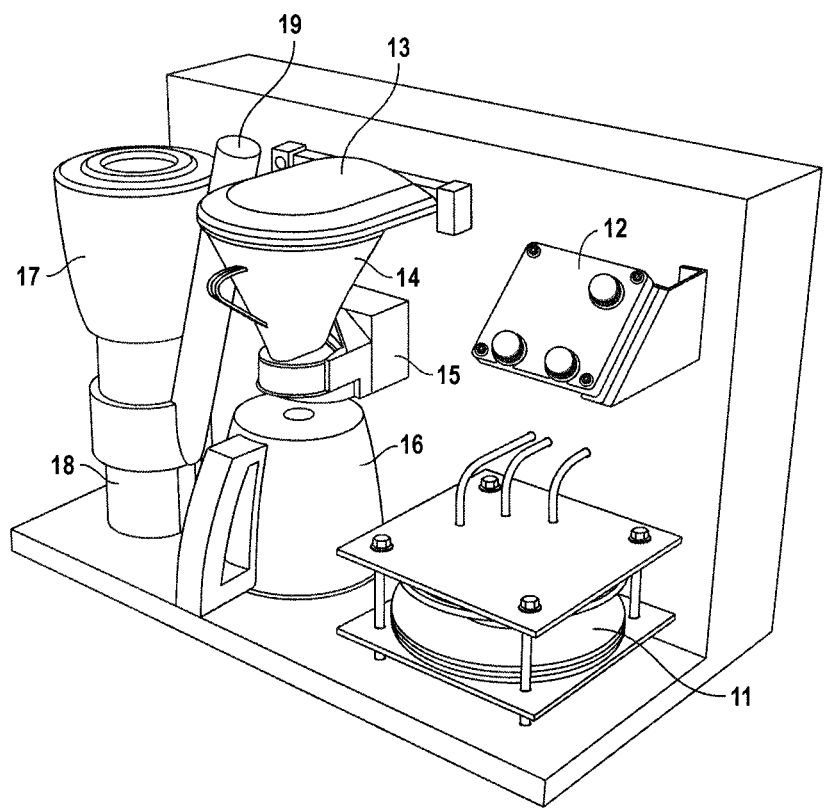
FIG. 1 is a perspective view of a preferred embodiment of the invention.

Novel features which are characteristic of the invention, as to organization and method of operation, together with further objects and advantages thereof will be better understood from the following description considered in connection with the accompanying drawings, in which preferred embodiments of the invention are illustrated by way of example. It is to be expressly understood, however, that the drawings are for illustration description only and are not intended as definitions of the limits of the invention. The various features of novelty which characterize the invention are recited with particularity in the claims.

There has been broadly outlined more important features of the invention in the summary above and in order that the detailed description which follows may be better understood, and in order that the present contribution to the art may be appreciated. There are, of course, additional features of the invention that will be described hereinafter and which will form additional subject matter of the claims appended hereto. Those skilled in the art will appreciate that the conception upon which this disclosure is based readily may be utilized as a basis for the designing of other structures, methods and systems for carrying out the several purposes of the present invention. It is important therefore, that claims be regarded as including such equivalent constructions insofar as they do not depart from the spirit and scope of the present invention.

Certain terminology and the derivations thereof may be used in the following description for convenience and reference only, and will not be limiting. For example, words such as "upward," "downward," "left," and "right" refer to directions in the drawings to which reference is made unless otherwise stated. Similar words such as "inward" and "outward" refer to directions toward and away from, respectively, the geometric center of a device or area and designated parts thereof. Reference in the singular tense include the plural and vice versa, unless otherwise noted.

The present invention is based upon the use of a microprocessor which is activated by a user for interfacing with various components of a coffee brewing device. The microprocessor is based upon the extraction chart shown as FIG. 10 herein. The chart, in turn, is based upon the Specialty Coffee Association of America (SCAA) recommendations noting the diagonal extraction line imposed thereon. The extraction line has a slope of dose of coffee/mass of water employed in the brewing process. For a given ratio of water to grinds, the outcome will be along the diagonal brew line which, again, is simply the ratio of percent extraction to percent total dissolved solids or % EXT to % TDS. To move to other states such as weak and bitter requires changing the ratio of coffee to water. The present invention enables one to achieve the ideal result and change results in a predictable and repeatable fashion by getting the right amount of water, at the right temperature, interacting with the right amount of coffee grinds at a suitable grind and with the right amount of interaction between grinds and water.

In recognizing these relationships, the present invention proposes a device for brewing coffee including a microprocessor, a user actuated control device for interfacing with the microprocessor, a tank for retaining water, a heating element for selectively heating the water, a brewing basket for receipt of water from the tank and a source of ground coffee where upon actuation of the control device by a user, the microprocessor dictates delivery of heated water from a tank and ground coffee to the brewing basket.

The present invention can also include a weighing station and a multichannel valve and actuator therefore, the details of which will be disclosed further within this application. The brewing basket includes a cone valve located at its output and an actuator therefore. The microprocessor can be made to control the actuator for selectively dispensing brewed coffee from the brewing basket at the appropriate time. A pump can be employed again actuated by the microprocessor for causing water to be selectively passed within the brewing basket either directly or through the later described multichannel valve. The pump can also be used to introduce air into the brewing basket for agitation and mixing. A stirrer can be used in its place, the details of which are disclosed in applicant's '514 application.

As noted above, the microprocessor is programmable to vary percent extraction and percent total solids in coffee brewed from device to device. Typically, approximately 16 parts of heated water are introduced to one part by weight of ground coffee resulting in approximately 20% extraction and approximately 1.25% total dissolved solids.

In employing the present invention, coffee can be introduced manually once the device has indicated the volume of heated water employed in brewing. Ideally, a hopper for beans can be made a part of the present system which would include a grinder and a device for transferring coffee to the brewing basket. A weighing station can be located proximate the brewing basket to weight its contents to actuate the appropriate introduction of water and/or ground coffee to achieve the ideal result. This can be accomplished through the use of an electronic balance appended to the brewing basket, the output of which is introduced to the microprocessor for controlling, for example, the amount of ground coffee once the weight of heated water is measured by this device.

Many of these features will be more readily apparent in further consideration of the appended drawings.

FIG. 1 is a perspective view of an embodiment of the present invention. It includes water heating tank 11, user interface 12, lid 13, above brew chamber 14, sitting on weighing mechanism 15, above carafe 16, hopper for beans 17, on top of grinder 18, and transfer mechanism 19. In common use, the hopper is filled with enough whole beans for several days of use and the settings for strength and extraction set according to taste preference. One then simply pours the desired amount of water into the heating tank and pushes a start button. Everything is then completely automated through a multiplicity of precision steps required to create the desired brew.

Not visible in this figure are the pipes, interconnections, valves, sensors, and the microprocessor. These will be described in more detail after each component is described.

The sections that follow describe each step and section of the system in detail.

It will be clear to one with ordinary skill in the art that any successful device of this kind should include a way for communicating with a user. There are numerous ways this may be accomplished. Although a few switches could be used to control the system, knobs and displays are commonly used in the prior art and would be considered mandatory in a high-end appliance. In all but the most simple of appliances, a micro controller is incorporated. This ubiquitous device is not only handy for servicing buttons and displays, it is also capable of carrying out the calculations needed for the described brewing method and for monitoring sensors, including continuous sensors through analogue to digital converters or digital connections.

Figure 2:
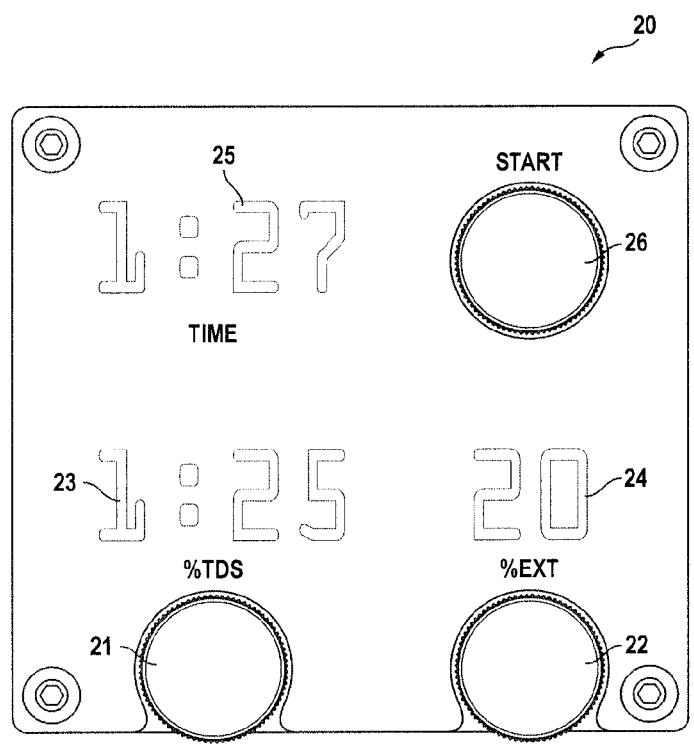
FIG. 2 is a front view of a user interface with knobs for setting preferences and digital displays for feedback to the user.

In turning to FIG. 2, user interface 20 is shown. User interface 20 is provided with knobs 21 and 22 for setting the % TDS and the % EXT. Displays 23 and 24 are used to show the selection. According to this invention, the required brew time is computed by the micro controller and indicated on display 25. All the user needs to do is push start button 26.

Other embodiments could have more or fewer knobs and displays. Other embodiments could include combinations of "cups", "grind", "roast", or others that prove useful or desirable in a given user interface.

Other preferred embodiments are to be exploited in order to create systems at other price points. For example, omitting the grinding station in the form of hopper 17, grinder 18 and ground coffee transport 19 yields an embodiment at a lower overall cost. In this embodiment, the user fills the water tank with more water than is needed and then shakes coffee grinds into the brew chamber. In this case a knob may be included to specify the grind being used. The system then exploits its capabilities to measure the grinds and water so that the correct amount of water may be delivered to produce the desired brew.

Yet another embodiment omits the weighing station for a lower price point. In one such embodiment, the user introduces the desired water quantity. The system determines the water volume automatically and then indicates to the user the number of "scoops" to be entered into the brewing chamber. How the features of the invention are used in each case will be more clearly understood in light of the following detailed description of each of the elements of the invention below.

Figure 3:
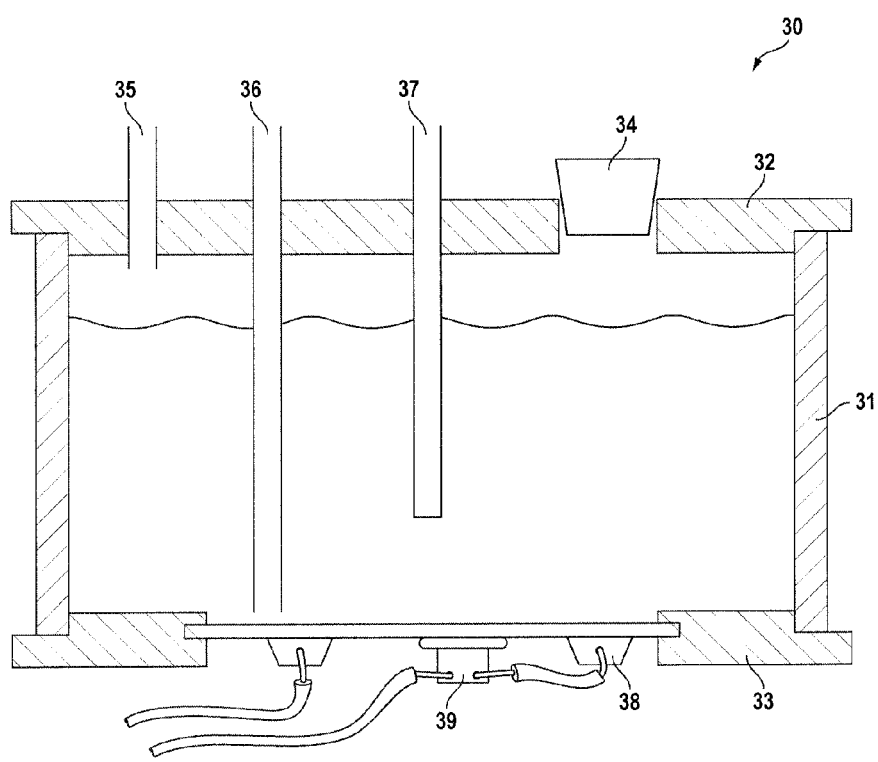
FIG. 3 is a cross sectional view of a water heating tank for use herein.

FIG. 3 shows the elements of heating chamber 30 of the invention. Housing 31 is fitted with water tight connections to lid 32 and bottom 33. The lid may have several intrusions including filling port 34 for introducing fresh water, air port 35, water out port 36 and continuous temperature sensor 37. The base includes heating element 38 wired through over temperature fuse 39.

The safety of the heating element is of paramount importance in coffee appliances. One line of defense in the prior art is the over temperature fuse attached directly to the heating chamber. This makes use of the fact that the chamber cannot go over 100 degrees C. if it is contact with water. Another line of defense in an electric kettle is a steam sensor. This is a delicate mechanical device attached to a mechanical power switch. The high volume of such devices from multiple vendors ensures that these devices are inexpensive and reliable. As such, continuous temperature sensors are not found in consumer kettles or coffee makers of the prior art.

In this preferred embodiment we need to know how much water is in the heating chamber. This is readily determined by noting that the electric heating element has a constant wattage. That is, it puts energy into the water at a constant rate. This means the temperature of the water will increase at a constant rate. In a preferred embodiment, a solid state temperature sensor is employed to monitor this temperature rise. The mass of the water is inversely proportional to the slope of the temperature change. In other embodiments this technique will also have utility in determining if there is enough water in the tank.

Once the system knows the water mass, it can compute the grinds needed according to equation 1. Many high end coffee makers include a grinder and in this embodiment a grinder may be used to deliver the computed dose of coffee needed.

Some models of the prior art employ a "blade grinder". This is a very simple idea employing a flat steel blade that turns at high rpm in a grinding chamber filled with beans. The user opens the chamber, pours in a dose, closes the chamber, and pushes the on button. The use of these devices is associated with an objectionable scream of noise as the blades collide with the beans followed by a high pitched wine as the powder is further pulverized. This type is generally discounted by coffee aficionados as the grind has a wide range of particle sizes and heats the beans, damaging the flavor.

When this idea is applied to an automatic coffee maker, a perforated screen separates the grind chamber from the brewing chamber. This arrangement allows particles to leave the grinder as soon as they get small enough. The entire assembly may be removed for rinsing.

Most aficionados prefer the "burr grinder". In this type, the coffee beans are drawn in between two hard plates. The plates may be flat or conical disks, depending on the manufacturer. The surfaces of the plates have hardened teeth that grind the beans to a minimum size before they are allowed to fall through. These are also driven by a direct connection high speed electric motor with their characteristic roar. This would seem necessary as the grinding time needs to be minimized for the convenience of the user.

When attached to an automatic coffee machine, care must be given to prevent contamination of the burrs from the brewing chamber. Spurious wet grinds and steam will tend to build up debris in the burrs compromising their operation.

For the highly automated coffee makers of the prior art, the total preparation time includes the time necessary to heat the water. This time is also available for the grinding process. So it is an object of the present invention to employ a reduction means from the grinding motor to the burrs. This allows the use of a substantially smaller and less expensive motor. The resulting noise from the grinder is correspondingly substantially reduced.

Figure 4:
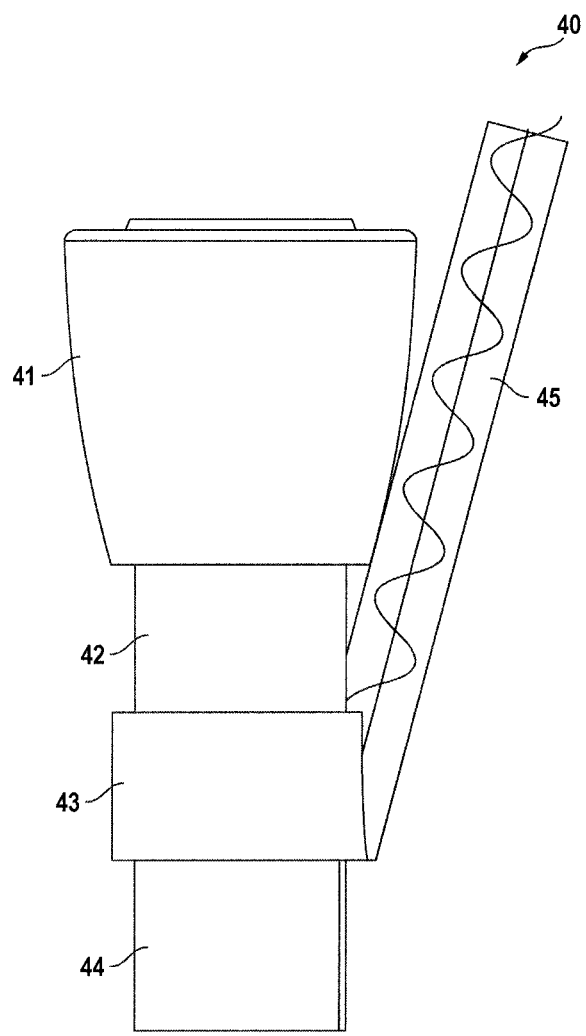
FIG. 4 is an elevational view of a grinder assembly for use herein.

As shown in FIG. 4 grinder assembly 40 may include hopper 41 burr grinder 42 connected through gear box 43 to a modest motor 44. While the motor turns at a high rate with low torque, the output of the gear box is on the order of 1 revolution per second with high torque. This eliminates the objectionable loud noise and replaces it with a subdued crunching sound.

The grinder draws beans from the hopper as needed for the computed brew. In this embodiment, the grind time is directly proportional to the dose delivered. Since the grind speed is slow and methodical, reasonable dose precision may be achieved in this manner.

In systems with a hopper one runs the risk of running out of beans before the dose is delivered. In a preferred embodiment, the current to the grind motor is monitored to detect this fault condition.

In the prior art, gravity is used to transfer grinds to the brewing chamber. This necessitates putting the grinder assembly on top of the brewing chamber. This adds considerably the height of the machine and makes the grinder vulnerable to intrusion from the steam of the brew chamber. A natural solution would be to use Archimedes screw 45 to lift grinds up to the brew chamber. Ordinarily, this would require a low speed actuator at additional cost, but in conjunction with this low speed grinder, a suitable gear box 43 is already available.

Figure 10:
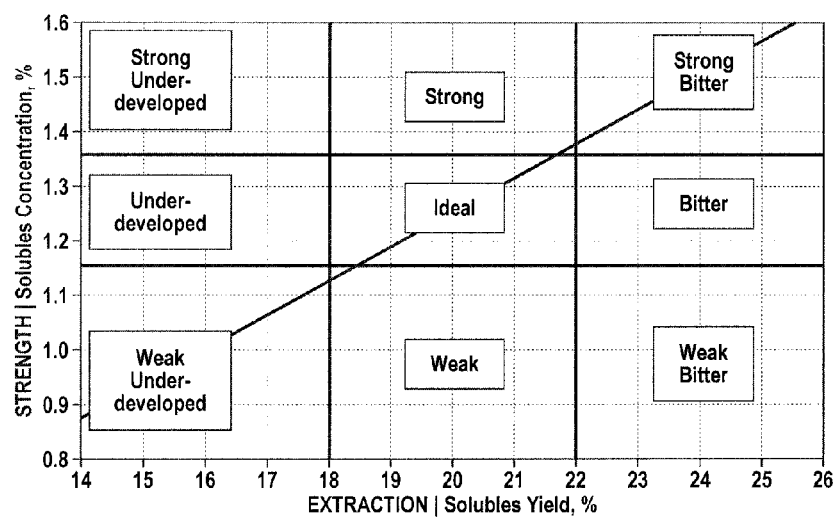
FIG. 10 is an extraction chart based upon SCAA recommendations.

It should be clear to one skilled in the art that a balance, electronic or otherwise, could be used by a skilled barista to measure out the components needed to make a brewed coffee beverage. This is now a common practice in specialty coffee brewing shops. In a straight forward embodiment, a simple balance could be used with a specified ratio of masses. For example, a recipe might be to use 12.5 grams of coffee to 200 grams of hot water. This is a ratio of 16 to 1, just what is needed to hit 20% extraction and 1.25% total dissolved solids as per the American Coffee Specialties Association recommendation (FIG. 10). If a higher strength of 1.35% is desired the balance ratio could be adjusted to 14.8 to 1. This embodiment has a remarkably high utility since any error in water or coffee just changes the amount of finished brew. The strength of the brew is constant.

While a pair of brass bowls hanging from a chain might be illustrative, it would be a bit unwieldy to use. For that reason alone it is preferred to use a modern electronic balance. In one embodiment, the balance could be external to, but connected electronically to, the brewing device. In a seamless manner, the mass reading of grinds and water could be relayed to the brewing device. In one embodiment, user feedback may be given to add more or less of grinds or water. In another embodiment, the electronic balance could be an integral part of a brewing system.

Figure 5:
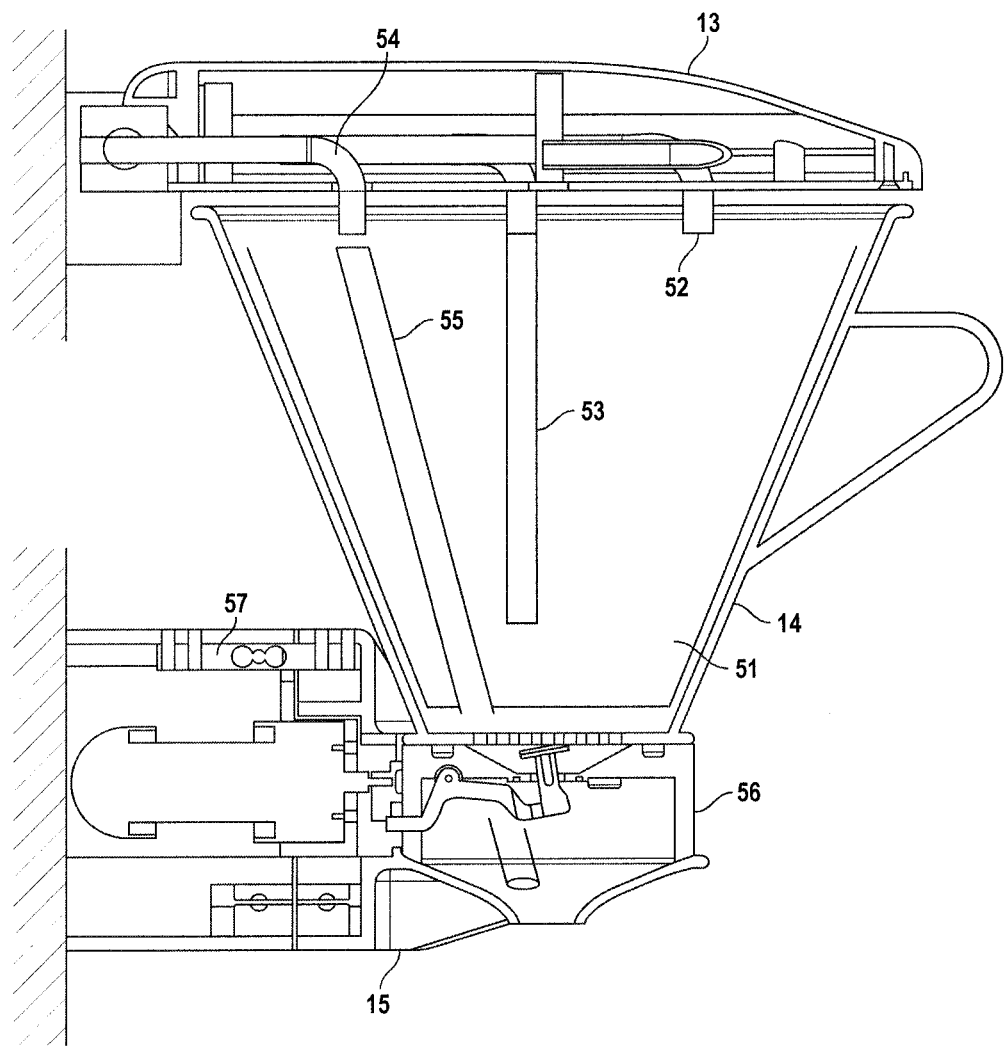
FIG. 5 is a cross sectional view of a brewing chamber, lid, and weighing station for use herein.

In a preferred embodiment, the balance may be integrated directly into the support of the brewing chamber as shown in FIG. 1 and in more detail in FIG. 5. In a preferred embodiment, brewing chamber 14 is a conical receptacle as is common in the art for holding paper filter 51, supported by electronic balance mechanism 15. This figure also shows lid 13, which can be insulated, with a multiplicity of ports for introduction of brew water 52, air agitation port 53, and dilution water port 54 positioned over bypass tube 55, and valve assembly 56. Throughout this disclosure, for the sake of convenience, valve assembly 56 is referred to as a "cone" valve assembly. However, one skilled in this art would readily appreciate that brewing chamber 14 need not be conical and, as such, cone valve assembly 56 simply refers to a valve assembly generally used with a brewing chamber of any geometry.

In this embodiment, coffee grinds may be directly measured and brew water may also be measured. As is well known in the art of electronic mass measurements, the prevailing high precision low cost method is to employ a full bridge strain circuit in the form of a Wheatstone bridge. Although it is common to outsource the fabrication of strain gauges to specialist there is little in the devices that cannot be readily fabricated by any circuit board manufacturer thus ensuring low manufacturing cost. These circuit boards 57 form the flexure mounts of the weighing station.

The net output of a Wheatstone bridge is a small voltage difference between two points. This is readily amplified with an instrumentation amplifier as needed to suit the range of an analog to digital converter. In one embodiment a gain of 1,000,000 can be employed to get an output voltage roughly mapping 0 to 5 volts to 0 to 100 grams. This is a suitable range for measuring a dose of coffee grinds.

Analog to digital converters are routinely included in micro controllers. These tend to be 10 bit devices. That is, for inputs of 0 to 5 volts, they output a number from 0 to 1023. In a typical embodiment with a range of 100 grams this implies a resolution of about $1/10$ gram. This is suitable precision for measuring a dose of coffee grinds.

If higher precision is required, analog to digital converters may allow use of a reference voltage. For example use of a reference voltage of 2.5 volts in the above example results in a resolution of about $1/20$ gram with a range of about 0 to 50 grams.

For higher capacities it is possible to use a second amplifier channel with a different gain. In one embodiment a second channel is employed to a separate analog to digital converter with a gain of 100,000. This has a range of about 0 to 1000 grams which is suitable for measuring water as will be discussed in more detail below. In a preferred embodiment, the electronic balance is used to measure the dose as it is being delivered. This ensures a precise dose delivery. If the dose is not precisely delivered, adjustments may be made later in the water delivery to insure brew precision.

Once the water is heated, it needs to be transferred to the brewing chamber. In one embodiment, the heating tank is located above the brew chamber. In this case, a mechanical valve would open allowing the water to flow into the brew chamber. In another embodiment, the heating tank is lower, affording a more compact apparatus. In this case a pump is needed to transfer the water. Fluid pumps are in common use in espresso machines. These add considerably to the cost and complexity of such machines.

As a preferred embodiment, a simple air pump can be used to transfer water. This approach is novel in the art of coffee brewing. It is particularly relevant in the case where an air pump is used for agitation. How this is integrated into the system in an economical and effective way described later in this disclosure. The steps required for this are a bit complicated. All of them are readily accomplished with a specialized multi-purpose valve described later. To clarify the steps consider the sequence listed in table 1:

TABLE 1

Open tank
Fill with water
Close tank, air tight seal
Open vent to prevent pressure build up
Turn on heating element TABLE 1-continued Wait until desired temperature is reached
Turn off heating element
Close vent
Connect air pump to tank
Turn on air pump
Wait until desired amount of water has been delivered
Turn off pump
Open tank vent releasing pressure stooping the flow of water Although the pressure required to push the water is low, the residual pressure in the tank continues to push water after the pump is turned off. This is why the last step of venting the tank is important. This is particularly the case if open loop timing is used to meter the water. This can be consistent if the tank is completely filled each time. The water delivered is simply a linear function of pump on time. If the tank is less than fully filled, a short time is needed to pressurize the tank. Since the amount of water may be inferred from the heating rate, an open loop compensation may be used to adjust the pump time up as needed, again assuring reasonable precision in delivering the desired amount of water.

In a preferred embodiment, the electronic balance is used to measure the water delivered while it is being delivered. On-off controller may be employed to deliver a specified volume. In a preferred embodiment, the pump intensity is proportional to the error in mass delivered. This is achieved in a practical and cost effective manner by pulse width modulating the air pump. In one embodiment a 1 Hertz frequency is used. As is common with a proportional controller, at first the pump is on 100% of each 1 second interval. As the water mass approaches the desired point, the pump turns off more and more of the 1 second interval. At the instant the target mass is reached, the pump turns off. Repeated use of this technique delivers water with precision of less than 1 gram.

Curiously, the two above techniques for delivering a specified amount of water are complimentary. Open loop timing is subject to error if the system leaks a tiny unknown amount. Such leaking is a natural artifact of simple air pumps fitted with reed valves and gets worse with age of the reed. Using the scale to precisely measure the water delivered allows the system to self-calibrate how much time is needed to deliver a volume of water. This will be of utility in a later discussion on dilution water. Another calibration point is available by allowing the heating chamber to cool considerably. Then a heating cycle can be used to measure the remaining water. The change in mass should correlate to the mass delivered.

Delivery of water in two measured amounts is of considerable utility when making large batches of coffee. For small amounts of coffee, up to and including two full mugs, or about 600 grams, a "#6 filter" can hold the entirety of the brew during the extraction process. Common coffee makers can deliver up to 32 fluid ounces or about 1 liter. In a common drip machine, water enters and drips out during the brewing process so the #6 filter is adequate. To hold all of the brew in a cone-like brewing chamber at one time would require a much larger cone, which is not a standard size in common use. It would also require that the entire assembly be considerably larger.

In a preferred embodiment, for brews larger than 500 grams, the brewing chamber is used to produce a stronger brew of 500 grams or less. At the time it is delivered to the carafe, a separate channel can deliver dilution water bringing the final product to the desired strength. As a specific example, to deliver a full pot of 1.25% TDS coffee one would use about 500 grams of water and 62.5 grams of coffee grinds. With 20% extraction, this will result in a strength of 2.5% TDS. As it is released to the carafe, an additional 500 grams is delivered from the heating tank to the carafe. This yields a full pot at 1.25% TDS. This is scaled as needed for each batch size.

The foregoing may seem complex and expensive. Indeed, if fabricated out of off the shelf components the complexity rivals that of an espresso machine. All of this is greatly simplified though the use of a novel multi valve assembly.

As background, a common type of valve is known as a stop cock. This is so easy to fabricate that they have been made for centuries out of metals, plastics, and even glass. In its most simple configuration it consists of a tapered plug in block with two ports. A hole through the block from one port to the other is interrupted by the plug. The plug is provided with a transverse hole. If the plug is turned to align the holes, the valve is open, else the valve is closed. It is also common in the art to have more than two ports and more than one hole in the plug. Thus "Y" valves of various configurations may be created.

In a first embodiment this idea is extended to include a multiplicity of ports for water, air, mechanical switches, and cone valve operation. Multi valve 60 is used for this purpose as such a valve, which can be fabricated from plastic, is reliable and inexpensive to produce. Alternatively a spool valve could be used and the present invention contemplates any valve assembly capable of performing as suggested below.

Figure 6A:
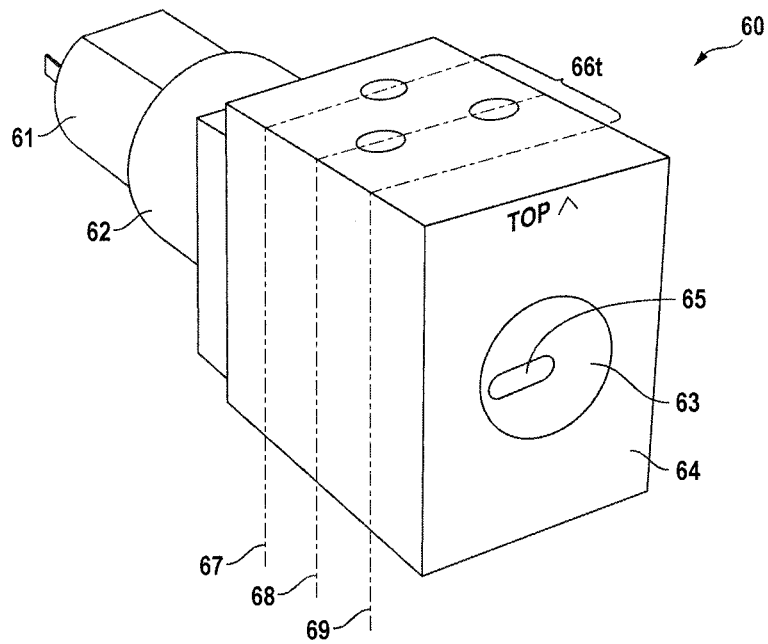
FIG. 6a is a top perspective view of a multi valve assembly with water and air ports for use herein.
Figure 6B:
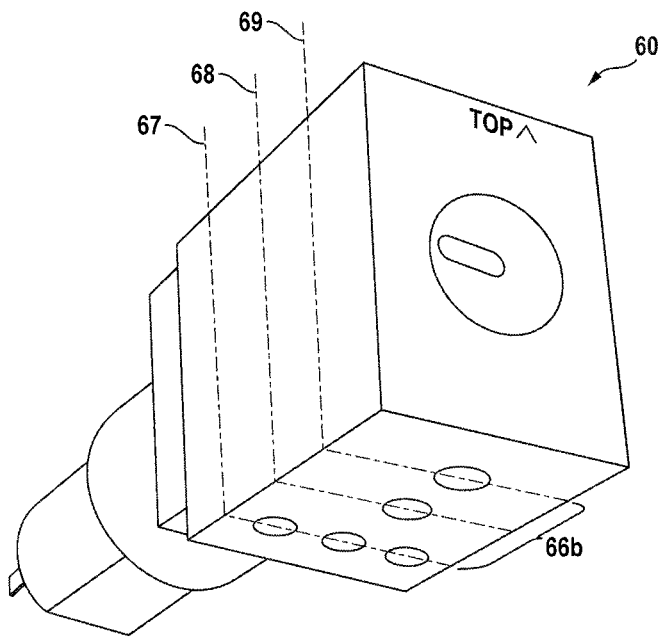

FIG. 6a shows a top perspective view of one embodiment of multi valve 60 suitable for use herein. A small motor 61 and gearbox 62 are included for turning plug 63. The tip of the plug is visible at the front of valve body 64. A feature 65 on the tip of the plug is provided to interface to the cone valve (not shown). A plurality of ports 66t are provided on the top of the valve body. A plurality of ports 66b are provided on the bottom of the body as seen in FIG. 6b. The position of each port is selected for manufacturing economy and to accommodate the connections to the other components of the system. That is, the tracks on the plug can accommodate a wide variety of port configurations.

The ports intercept the plug in three distinct tracks. Proximal to the motor are four ports for air 67. The distal track 69 has a single port for a mechanical interface to the heater switch. The mid track 68 has three ports for water direction.

Figure 7A:
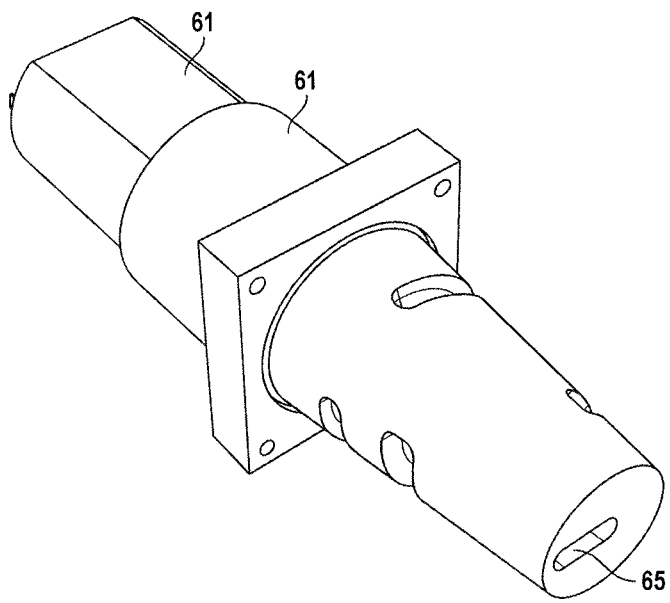
FIG. 7a is a top perspective view of a multi valve assembly of FIGS. 6a and 6b with its valve body removed showing a tapered core with a multiplicity of channels.
Figure 7B:
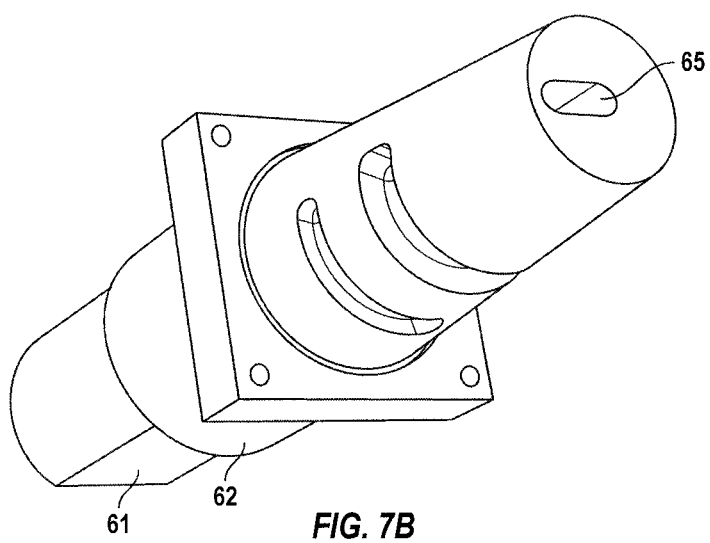

The nature of the tracks is more evident by examining FIGS. 7a and 7b which show the multi valve with the valve body removed. At each angle of the plug, the correct combination of water and air connections are made.

The small motor and gearbox turn the plug a single turn to make a batch of coffee. The motion of the motor is controlled by the micro controller in a stop-and-start manner as needed by the brew parameters. In this preferred embodiment, the motor or multi valve activator only needs to turn in one direction. The multi valve performs all of the connections specified in Table 1 while turning through a first half of a rotation. In the second half rotation the multi valve sequentially makes the additional connections as described in Table 2.

TABLE 2

Disconnect air pump from heating tank
Connect air pump to the air agitation tube
Air pump is pulsed each second during the brew time providing agitation
Disconnect pump from agitation tube
Connect air pump to heating tank
Close vent of heating tank
Connect heating tank water to dilution channel
Air pump turns on for a specified time delivering dilution water TABLE 2-continued Turn to final position opening the cone valve
Turn to start position closing the cone valve The entire sequence for this embodiment is tabulated in the table below.

| State | angle (degrees) | Job | Cone Valve | Heater Switch | Air to Tank Port | vent port | Air Pump port | Agitation Port | water Tank Port | Spray Head Port | Dilution Water Port |
|---|---|---|---|---|---|---|---|---|---|---|---|
| 0 | 0 | Ready | closed | off | to vent | to tank | na | na | na | na | na |
| 1 | 45 | Heating | closed | on | to vent | to tank | na | na | na | na | na |
| 2 | 90 | Heater Off | closed | off | to vent | | | | | | |
| 3 | 135 | Water Transfer | closed | off | to Pump | na | to tank | na | to spray | from tank | closed |
| 4 | 180 | Brewing | closed | off | na | na | to agitator | na | na | na | na |
| 5 | 270 | Evacuation/Dilution | open | off | to pump | na | to tank | na | to Dilution | closed | from tank |

Figure 8:
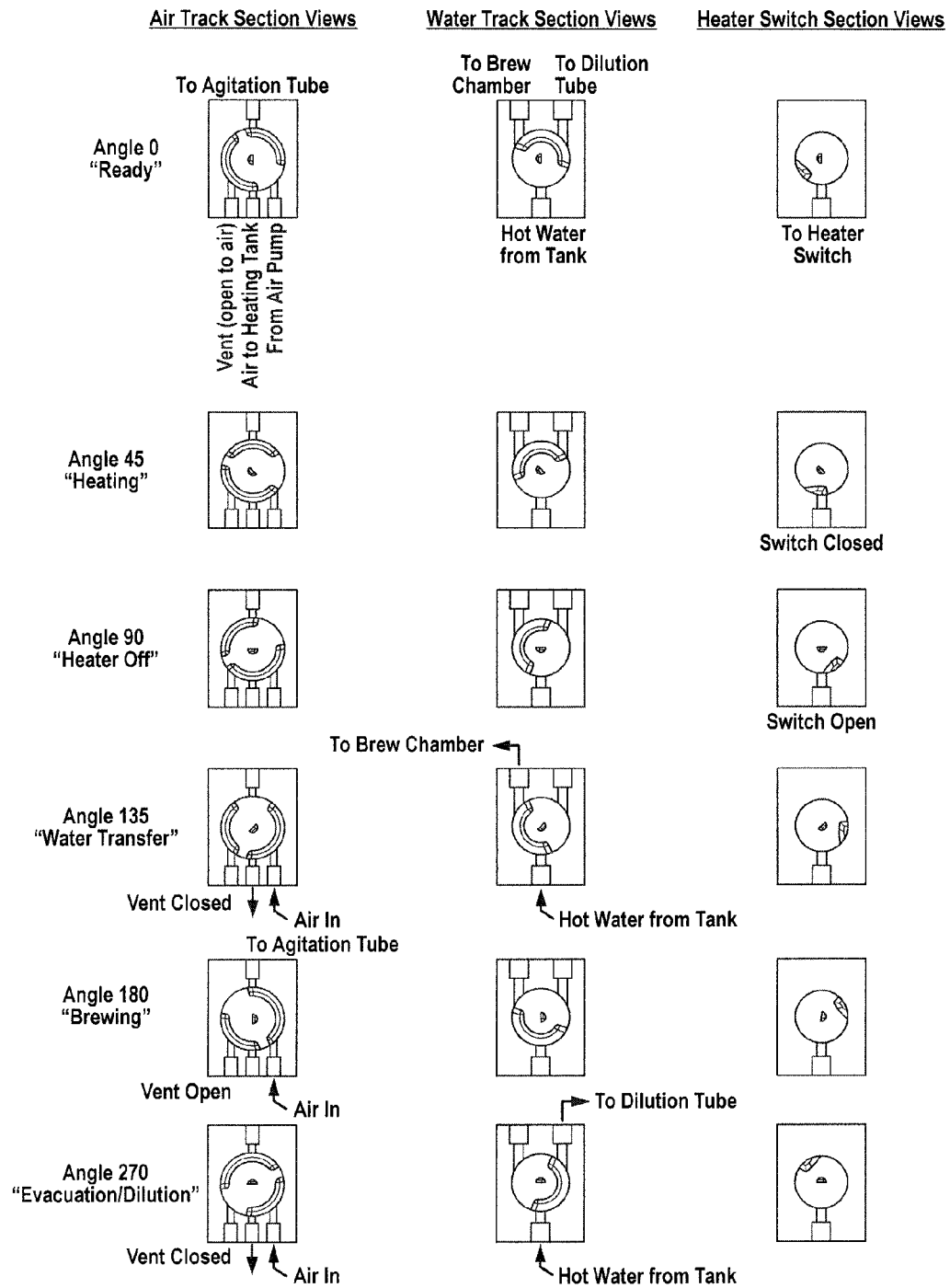
FIG. 8 is a schematic representation of the various fluid paths established by multivalve assembly shown in FIGS. 6a through 7b.

To fully visualize this sequence, consider the cross sections of FIG. 8. Each column shows the switch track, water track and air track respectively. Each row is for a specific angle of the plug as listed in the table above. Note that in some states, some connections are "not applicable" and so the table indicates "na".

Figure 9:
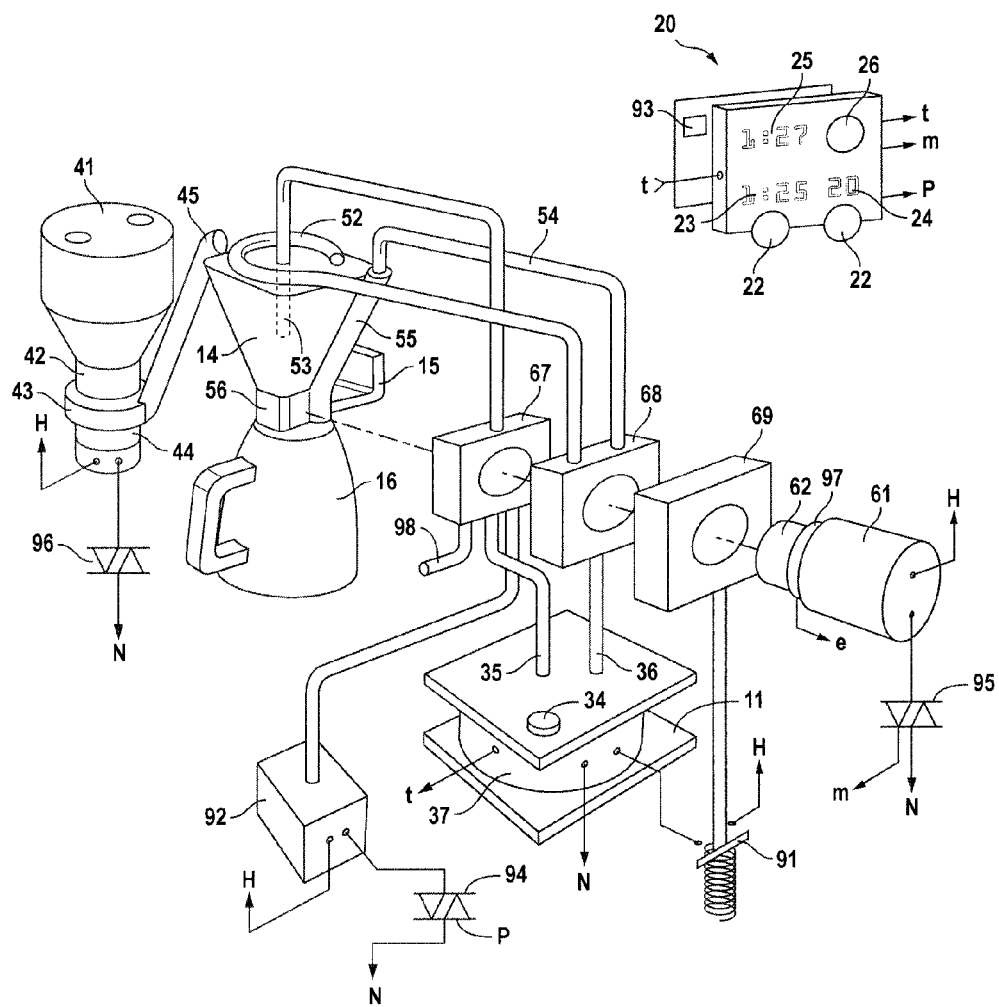
FIG. 9 is an exploded perspective view of an example of the present invention providing the various respective parts constituting an embodiment thereof.

The entire system constituting a preferred embodiment of the present invention is presented in FIG. 9. The heater switch track 69 has a single function. The ramp in this track operates a mechanical switch 91 for turning on the heating element 38 (FIG. 3). Mechanical switches can be cheaper than solid state devices for such high currents. The mechanical switch may also be actuated by over pressure and over temperature devices as are common in the prior art.

For smaller electrical loads, small FETs are inexpensive. These are particularly appropriate for controlling pump 92, multi valve motor or actuator 61 and even the grinder motor, 44. These FETS are readily controlled by the microprocessor 93 contained in the user interface 20. The FETs of FIG. 9, (94, 95, 96) are each shown connected to the "neutral" (N) of the power mains. The other side of each controlled device is shown connected to the power mains "hot" (H).

In operation, the user begins by selecting the desired strength by setting the % TDS with knob 21. The selected value is displayed by seven segment display 23. The user also sets the % EXT with knob 22 which is displayed at 24. At this point the brew time may be computed from equation 2 and may be displayed at 25 in minutes and seconds. This is not the same as the total cycle time which might include water heating and evacuation times. The user also ensures that there is an adequate supply of coffee beans in the hopper 41. The desired amount of water is put into the heating chamber 11 through filling port 34. In this illustration the filling port is portrayed as a "stopper" but it will be clear to one skilled in the art that there could be other means as long as it provides an air tight seal. An over pressure release could also be incorporated into the filling port. It is also required that the spent grinds from a previous brew are removed. The electronic balance can readily sense the removal of the brewing chamber, and its return. The sensitivity of the balance is sufficient to also detect the insertion of a new paper filter.

Now everything is set and ready to go. If any of the preparation steps above have not been completed, the user is alerted that one or more items needs attention. This can even include a preliminary check that water is in the heating tank. Lastly, the user needs only push the start button to start the brewing sequence.

The first thing that happens is that FET 95 turns on as commanded through connection (m). This turns on multi valve motor or actuator 61. The output of the motor or the gear box 62 is monitored by encoder 97. The encoder may be a potentiometer, one or more switches such as optical or Hall-Effect devices as are dictated by overall cost constraints. The output of the encoder (e) is monitored by microprocessor 93.

When the multi valve gets to about 45 degrees switch 91 is closed. This energizes the heater which starts heating the water. It should also be noted that the air channel at this state connects the heating tank to vent 98. This connection is essential to prevent pressure build up in the tank during the heating cycle.

While the water heats, its temperature rises at a constant rate. This rate is inversely proportional to the quantity of water in the tank. The temperature is closely monitored by electronic temperature gauge 37 connected to the microprocessor though connection (t). After a few seconds of collecting temperature data, a low passed estimate of the water mass is attained. Then equation 3 may be used to compute the required dose of coffee.

While the water continues to heat up, coffee beans are ground and delivered to the brewing chamber through delivery screw 45. The dose is estimated either by grind time or in conjunction with the weighing station. If the weighing station is used, it may suffice to just turn off the grinder when the desired dose is sensed. In more elaborate methods a pulse-width-modulation (PWM) scheme may be used to improve the precision of the delivery. In some preferred embodiments, a clutch may be used to change the connection to the grinder and delivery screw. In one such embodiment, the grinder may be reversed keeping additional beans from entering the grinder burrs, while the last of the grinds are delivered to the brewing chamber. It is important that the dose delivery happens in a timely manner before the water reaches the brewing temperature. If this is not the case, the multi valve would need to turn backwards to cycle the heater. This involves a modest complexity and cost increase.

With the dose in place, it is a short time before the water reaches the desired brew temperature. This is generally taken to be a few degrees short of boiling. When this temperature is detected, multi valve FET 95 turns on again, advancing the state of the valve. At about 90 degrees the heater switch turns off. It is important that the vent is still connected at this point. The valve continues to advance until the angle is about 135 degrees and then it stops.

At this valve angle, the vent is now closed and air pump 92 is connected to the heating tank through the channels of the multi valve. In the water channel of the valve, the water connection from the water out port 36 is now connected to spray head 52. At this point the air pump is turned on by FET 94 through connection (p) from the microprocessor.

As the water is delivered to the brew chamber, the electronic balance notes the steady change in mass. When the mass stops changing, the entire water mass has been delivered. In some embodiments, it may be desired to deliver only part of the water. In this preferred embodiment, the air pump is modulated as the desired mass is approached. The rate of water delivery may be used as a calibration value on the water delivery for a later step in some embodiments.

Once the prescribed water has been delivered to the brewing chamber the multi valve may be advanced to the next state at about 180 degrees. In this state the air pump is attached not to the heating tank, but to the air agitation port 53. The capacity of the air pump is substantial and could agitate the brew too much, causing excessive cooling. So Pulse Width Modulation is used again to deliver small bursts of air into the brewing slurry.

The extraction proceeds for a time specified by equation 2. The seven-segment LED display 25 may display the remaining time as it counts down. At the end of this interval, the multi valve advances to the final state at about 270 degrees. In this state the cone valve is actuated allowing the completed brew to drain into the carafe.

In some preferred embodiments, the brew chamber is not large enough to hold the entire brew. In this case, the system will automatically make a brew with a higher concentration. In this case dilution water is needed in the carafe. So in this last state the air track closes the vent and connects the air pump to the tank again. The water out port 36 is now connected to bypass-water tube 54 delivering dilution water to bypass 55.

After the dilution water has been delivered and a sufficient amount of time has been allowed for the evacuation from the brew chamber, the multi valve returns to the start position at angle zero ready to start the next brew cycle.

As a further preferred embodiment, the temperature of the brew chamber is considered. It would be possible to add additional heating elements as needed in various places. Of particular interest is maintaining the temperature of the brewing chamber during the brewing cycle. One embodiment includes a secondary heating element. A proportional controller could be employed to keep the brew at a constant temperature. It should be recognized that much of the loss of temperature is due to heating the multi valve and the brew chamber itself. An additional feature of the multi valve would be to provide a preheating channel to preheat the system with the brew water before the brew water is introduced. Recirculating hot water could also be used to heat the system.

In a further preferred embodiment, the brew chamber and lid are thermally insulated, helping to maintain the temperature during the brew period. In calibrating a production design, one needs to be sure to note the drop in temperature in transferring the water from the heating tank to the brewing chamber. If a second batch is made right away, a small temperature compensation could be made if necessary.

The above disclosure is sufficient to enable one of ordinary skill in the art to practice the invention, and provides the best mode of practicing the invention presently contemplated by the inventor. While there is provided herein a full and complete disclosure of the preferred embodiments of the invention, it is not desired to limit the invention to the exact construction, dimensions, relationships, or operations as described. Various modifications, alternative constructions, changes and equivalents will readily occur to those skilled in the art and may be employed as suitable without departing from the true spirit and scope of the invention. Such changes might involve alternative materials, components, structural arrangements, sizes, shapes, forms, functions, operational features or the like. Therefore, the above description and illustration should not be considered as limiting the scope of the invention, which is defined by the appended claims.

What is claimed is:

1. A device for brewing coffee comprising a microprocessor, a user actuated control device for interfacing with said microprocessor, a tank for retaining water, a heating element for selectively heating said water, a brewing basket for receipt of water from said tank and ground coffee, a weighing mechanism and a cone valve assembly at an output of said brewing basket for controllably dispensing brewed coffee from said brewing basket, said microprocessor being interfaced with a controller for a multichannel valve assembly such that upon actuation of said user activated controller, a quantity of coffee to be brewed is introduced to said brewing basket and weighed by said weighing mechanism and a control signal from said weighing station supplied to said microprocessor, said microprocessor generating a control signal for actuating a pump and selecting a first orientation for said multichannel valve assembly for feeding a measured quantity of heated water to said brewing chamber based upon said quantity of coffee and further generating a control signal to said valve assembly and pump to terminate the feeding of water to said brewing basket after said measured quantity of heated water had been introduced thereto and further generating a control signal to said cone valve for selectively opening said cone valve assembly for dispensing brewed coffee from said brewing basket.

2. The device of claim 1 further comprising means for mixing said heated water and coffee within said brewing basket, said means for mixing being activated by a control signal from said microprocessor.

3. The device of claim 2 wherein said means for mixing comprises a paddle stirrer.

4. The device of claim 2 wherein said means for mixing comprises compressed air.

5. The device of claim 1 wherein said microprocessor is programmed to produce brewed coffee having approximately twenty percent extraction.

6. The device of claim 1 wherein said microprocessor is programmed to receive input based upon the grind number of the coffee, said grind number used to adjust said control signals.

7. The device of claim 1 further comprising a hopper for storage of coffee beans.

8. The device of claim 7 further comprising a grinder for said coffee beans.

9. The device of claim 8 wherein input from said grinder to said brewing basket is activated by a signal from said microprocessor.

10. The device of claim 9 wherein said output is determined by the weight of coffee measured by said weighing mechanism.

11. The device of claim 1 wherein said user actuated control device comprises input for selecting percent total dissolved solids of said coffee to be brewed and percent extraction of said ground coffee.

12. The device of claim 1 wherein said heating element is of a constant wattage.

13. The device of claim 1 wherein said device further comprises a temperature sensor for sensing water temperature in said tank.

14. A device for brewing coffee comprising a microprocessor, a user actuated control device for interfacing with said microprocessor, a tank for retaining water, a heating element for selectively heating said water, a brewing basket for receipt of water from said tank and a source of ground coffee wherein upon actuation of said control device, said microprocessor dictating delivery of heated water from said tank and said ground coffee to said brewing basket and further comprising a weighing station, the output of which is fed to said microprocessor and further comprising a multichannel valve and actuator therefore, said microprocessor controlling said actuator for changing fluid flow through said multichannel valve and further comprising a pump and actuator therefore, said microprocessor controlling said actuator for causing water to be selectively passed through said multichannel valve and air to be introduced into said brewing basket for mixing.

15. The device of claim 14 further comprising a cone valve assembly located at the output of said brewing basket and an actuator therefore, said microprocessor controlling said actuator for selectively dispensing brewed coffee from said brewing basket.

16. The device of claim 14 wherein said pump and multichannel valve being configured to selectively direct water to dilute brewed coffee emanating horn said brewing basket.

17. The device of claim 14 wherein said microprocessor is programmable to vary percent extraction and percent total dissolved solids in coffee brewed from said device.

18. The device of claim 17 wherein said microprocessor causes delivery of approximately sixteen parts by weight heated water to one part by weight ground coffee resulting in brewed coffee having approximately twenty percent extraction and approximately 1.25% total dissolved solids.

19. The device of claim 14 wherein said brewing basket is thermally insulated.

20. A device for brewing coffee comprising a microprocessor, a user actuated control device for interfacing with said microprocessor, a tank for retaining water, a heating element for selectively heating said water, a brewing basket for receipt of water from said tank, a cone valve assembly located at a dispensing end of said brewing basket, a device for indicating to said microprocessor the quantity of heated water delivered to said brewing basket and further comprising a hopper for retaining a supply of coffee beans and a grinder positioned to receive coffee beans to be ground from said hopper and further comprising an Archimedes screw for transferring ground coffee from said grinder to said brewing basket.

21. The device of claim 20 further comprising an indicator informing a user of an amount of ground coffee to mix with said heated water within said brewing basket.

22. The device of claim 20 further comprising a continuous temperature sensor for sensing temperature of said water.

23. The device of claim 22 wherein said continuous temperature sensor is joined to a power switch for said heating element.

24. The device of claim 20 further comprising a weighing station located proximate said brewing basket to weigh the contents thereof.

25. The device of claim 24 wherein said weighing station comprises an electronic balance.

26. The device of claim 25 wherein said electronic balance is positioned to weigh ground coffee as it is introduced into said brewing basket, the output of said electronic balance being introduced to said microprocessor for controlling quantities of said ground coffee so introduced.

27. The device of claim 20 wherein said tank is positioned above said brewing basket for selective gravitational transfer of water thereto.

28. The device of claim 20 wherein said tank is positioned at or below said brewing basket, said device further comprising a pump selectively actuatable by said microprocessor for transferring water from said tank to said brewing basket.

29. The device of claim 28 wherein said pump comprises an air pump.

30. The device of claim 28 wherein output of said pump is further joined to said brewing basket for selective introduction of air thereto for mixing contents of said brewing basket therein.

31. The device of claim 25 wherein said electronic balance is positioned to weigh heated water as it is introduced into said brewing basket, the output of said electronic balance being introduced to said microprocessor for controlling quantities of heated water so introduced.

32. The device of claim 28 wherein said pump is controlled by pulse width modulation.

33. The device of claim 20 wherein said quantity of heated water is introduced to said brewing basket in multiple measured amounts.

34. The device of claim 20 further comprising a feed line for selective delivery of heated water from said tank to a quantity of brewed coffee emanating from said brewing basket.

35. The device of claim 20 wherein said electronic balance is positioned to weigh heated water as it is introduced into said brewing basket, the output of said electronic balance being introduced to said microprocessor for controlling quantities of heated water so introduced.

36. The device of claim 20 further comprising a heat source for preheating and maintaining temperature of the brewing basket.

37. The device of claim 20 wherein said brewing basket is thermally insulated.

38. A device for brewing coffee comprising a microprocessor, a user actuated control device for interfacing with said microprocessor, a tank for retaining water, a heating element for selectively heating said water, a brewing basket for receipt of water from said tank, a cone valve assembly located at a dispensing end of said brewing basket, a device for indicating to said microprocessor the quantity of heated water delivered to said brewing basket and further comprising a weighing station including an electronic balance located proximate said brewing basket to weigh the contents thereof.

39. The device of claim 38 further comprising an indicator informing a user of an amount of ground coffee to mix with said heated water within said brewing basket.

40. The device of claim 38 further comprising a continuous temperature sensor for sensing temperature of said water.

41. The device of claim 40 wherein said continuous temperature sensor is joined to a power switch for said heating element.

42. The device of claim 38 further comprising a hopper for retaining a supply of coffee beans and a grinder positioned to receive coffee beans to be ground from said hopper.

43. The device of claim 42 further comprising means for transferring ground coffee from said grinder to said brewing basket.

44. The device of claim 43 wherein said means for transferring coffee comprises an Archimedes screw.

45. The device of claim 38 wherein said electronic balance is positioned to weigh ground coffee as it is introduced into said brewing basket, the output of said electronic balance being introduced to said microprocessor for controlling quantities of said ground coffee so introduced.

46. The device of claim 38 wherein said tank is positioned above said brewing basket for selective gravitational transfer of water thereto.

47. The device of claim 38 wherein said tank is positioned at or below said brewing basket, said device further comprising a pump selectively actuatable by said microprocessor for transferring water from said tank to said brewing basket.

48. The device of claim 47 wherein said pump comprises an air pump.

49. The device of claim 47 wherein output of said pump is further joined to said brewing basket for selective introduction of air thereto for mixing contents of said brewing basket therein.

50. The device of claim 47 wherein said pump is controlled by pulse width modulation.

51. The device of claim 38 wherein said quantity of heated water is introduced to said brewing basket in multiple measured amounts.

52. The device of claim 38 further comprising a feed line for selective delivery of heated water from said tank to a quantity of brewed coffee emanating from said brewing basket.

53. The device of claim 38 further comprising a heat source for preheating and maintaining temperature of the brewing basket.

54. The device of claim 38 wherein said brewing basket is thermally insulated.

55. A device for brewing coffee comprising a microprocessor, a user actuated control device for interfacing with said microprocessor, a tank for retaining water, a heating element for selectively heating said water, a brewing basket for receipt of water from said tank, a cone valve assembly located at a dispensing end of said brewing basket, a device for indicating to said microprocessor the quantity of heated water delivered to said brewing basket and a multichannel valve assembly, said multichannel valve assembly comprising a motor selectively activated by said microprocessor, and a plurality of channels for selectively directing fluids therethrough.

56. The device of claim 55 wherein said multichannel valve assembly further comprises a gear box between said motor and plurality of channels.

57. The device of claim 55 wherein said multichannel valve assembly further comprises an interface for controlling said cone valve assembly.

58. The device of claim 55 further comprising a heat source for preheating and maintaining temperature of the brewing basket.

59. The device of claim 55 wherein said brewing basket is thermally insulated.

* * * * *